(12) United States Patent
Slusarczyk et al.

(10) Patent No.: US 9,593,735 B2
(45) Date of Patent: Mar. 14, 2017

(54) HYDRAULIC SUSPENSION DAMPER WITH A SPRING VALVE ASSEMBLY

(71) Applicant: BeijingWest Industries, Co., Ltd., Beijing (CN)

(72) Inventors: Pawel Slusarczyk, Cracow (PL); Jakub Wrzesinski, Cracow (PL); Robert Kapolka, Cracow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 14/433,301

(22) PCT Filed: Jul. 4, 2013

(86) PCT No.: PCT/CN2013/078807
§ 371 (c)(1),
(2) Date: Apr. 2, 2015

(87) PCT Pub. No.: WO2015/000160
PCT Pub. Date: Jan. 8, 2015

(65) Prior Publication Data
US 2015/0260253 A1    Sep. 17, 2015

(51) Int. Cl.
*F16F 9/34* (2006.01)
(52) U.S. Cl.
CPC ..................... *F16F 9/34* (2013.01)
(58) Field of Classification Search
CPC .. F16F 9/34; F16F 9/348; F16F 9/3485; F16F 9/446

(Continued)

(56) References Cited

U.S. PATENT DOCUMENTS

| 4,096,928 A | 6/1978 | Krafzig et al. |
| 4,352,417 A | 10/1982 | Stinson |

(Continued)

FOREIGN PATENT DOCUMENTS

| CN | 200978908 Y | 11/2007 |
| CN | 101809312 A | 8/2010 |

(Continued)

OTHER PUBLICATIONS

State Intellectual Property Office of China Search Report, English Translation, Dated Jul. 26, 2016, 3 Pages.

(Continued)

*Primary Examiner* — Nicholas J Lane
(74) *Attorney, Agent, or Firm* — Dickinson Wright PLLC

(57) ABSTRACT

A hydraulic damper (2) includes at least one spring valve assembly (28b, 28c) having a body (231, 261) provided with through flow channels (282), at least one deflectable disc (281) covering these through flow channels (282), and a supporting member (285, 285c) fixed to an axial member for clamping the at least one disc (281) at the inner circumferential part thereof. A spring seat (283b, 283c) is disposed around the supporting member (285, 285c) and abuts the at least one deflectable disc (281) in at least one radial position (2831, 2832) at the outer circumferential part thereof. A spring (284) is preloaded between the spring seat (283b, 283c) and the supporting member (285, 2851c). The spring seat (283b, 283c) includes at least one axial projection (2833b, 2833c) perimetrically engaging the at least one disc (281), and a circular gap (286) is provided between the spring seat (283b, 283c) and the supporting member (285, 2851c).

6 Claims, 4 Drawing Sheets

(58) Field of Classification Search
USPC .......................................... 188/282.8, 282.9
See application file for complete search history.

(56) References Cited

U.S. PATENT DOCUMENTS

| | | | |
|---|---|---|---|
| 4,721,130 | A | 1/1988 | Hayashi |
| 5,755,305 | A | 5/1998 | Deferme et al. |
| 6,230,858 | B1 | 5/2001 | Moradmand et al. |
| 6,336,536 | B1 * | 1/2002 | Fenn ................ F16F 9/3485 188/282.6 |
| 8,297,418 | B2 * | 10/2012 | Bombrys ............ B60G 13/08 188/275 |
| 2002/0063023 | A1 * | 5/2002 | Moradmand ........ F16F 9/3485 188/282.1 |

FOREIGN PATENT DOCUMENTS

| | | |
|---|---|---|
| CN | 102686902 A | 9/2012 |
| CN | 103032503 A | 4/2013 |
| EP | 699896 | 11/1953 |
| EP | 1925845 A1 | 5/2008 |
| EP | 2233775 A1 | 9/2010 |
| GB | 699896 | 11/1953 |
| PL | 358599 A1 | 8/2004 |
| PL | 207184 B1 | 11/2010 |
| PL | 207185 B1 | 11/2010 |
| WO | 2013086761 A1 | 6/2013 |

OTHER PUBLICATIONS

The Intellectual Property Office of China First Notification of Office Action, English Translation, Dated Jul. 26, 2016, 9 Pages.
Supplementary European Search Report; Dated Jul. 16, 2013; Eight (8) Pages.

* cited by examiner

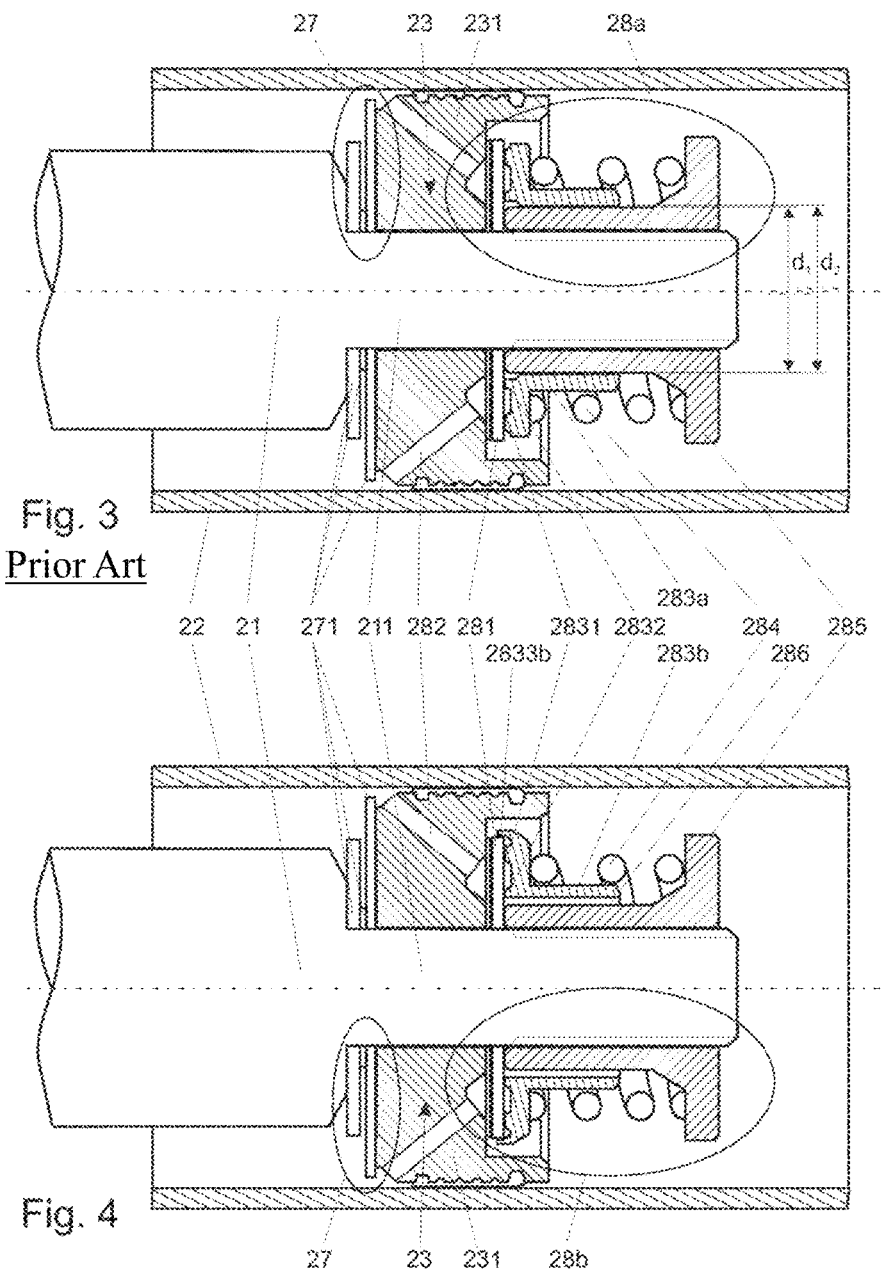

HYDRAULIC SUSPENSION DAMPER WITH A SPRING VALVE ASSEMBLY

CROSS REFERENCE TO RELATED APPLICATION

This application claims the benefit of PCT International Application Serial No. PCT/CN2013/078807 filed on Jul. 4, 2013 and entitled a "Hydraulic Suspension Damper with a Spring Valve Assembly", the entire disclosure of which is incorporated herein by reference.

FIELD OF THE INVENTION

The invention relates to a hydraulic damper, in particular a motor vehicle suspension damper, comprising a tube filed with working liquid inside of which a slidable piston body attached to a piston rod led outside the damper is disposed, wherein the flow of the working liquid is controlled within said tube during the rebound and the compression stroke of the piston body by at least one spring valve assembly provided with an axial member and rebound and compression valves surrounding the axial member. Said at least one spring valve assembly comprises
  a body provided with through flow channels,
  at least one deflectable disc covering these through flow channels,
  a supporting member fixed to said axial member,
  a spring seat disposed around said supporting member and abutting said at least one disc in at least one radial position at the outer circumferential part thereof, and
  a spring preloaded between the spring seat and the supporting member.

BACKGROUND OF THE INVENTION

Valve assembly of this kind, where the spring seat is disposed slidably around the supporting member, is known from the state of art (cf. for example Polish patent applications P. 358597, P. 358598, P. 358599 and European patent applications EP 1925845 A1, EP 2233775). For its efficient operation it is absolutely essential to ensure substantially frictionless sliding (axial) movement of the spring seat with respect to the supporting member.

Various factors contribute to this problem including eccentricity and radial dimensional tolerances of particular elements of the valve assembly, possible buckling of the spring and distribution of the axial pressure exerted by the spring over the perimeter of the spring seat.

Influence of friction on operation of a valve assembly of this kind may be observed by measuring the force reaction of a damper in dependence to the velocity of the piston rod (a force to velocity characteristic). As it appears a substantial hysteresis occurs.

In other words forces measured while the piston rod accelerates to trigger opening of the spring valve assembly and deflection of discs are higher than forces measured while the piston rod decelerates to close the spring valve assembly and discs move to their neutral position. A difference exists therefore between damping forces generated by the damper for the same velocity of the piston rod but measured during its acceleration or deceleration and it is desirable to limit this difference as much as possible in order to improve the damper performance, repeatability coefficient and also the comfort for the passengers of the vehicle.

Patent specification GB 699896 discloses a hydraulic shock absorber, where a spring seat has a form of an abutment ring having an outwardly extending flange which rests upon the outer deflectable disc adjacent its outer edge. The outer deflectable disc is provided with an orifice covered by the inner deflectable disc and a clearance exists between the abutment ring and a cylindrical member that allows fluid communication through said orifice between the flow channels and the chamber of the shock absorber once the discs are deflected.

Patent specification U.S. Pat. No. 4,096,928 discloses a valve assembly for a shock absorber, where a spring seat has a form of a valve cage having a cylindrical portion surrounding the resilient valve disc for a centered guiding thereof. The cylindrical portion has an edge face which serves as an abutment for cooperating with the closing disc.

It has been the object of the present invention to provide a hydraulic damper having an improved sensitivity of operation in a result of minimizing the friction between cooperating elements of the valve assembly.

Another object of the present invention is to provide a hydraulic damper that would enable to achieve comparable working characteristic of all dampers in the line production within a large range of dimensional tolerances of the damper components in order to minimize the production specific losses, decrease the costs of production and increase the result repeatability coefficient.

SUMMARY OF THE INVENTION

In order to accomplish the aforementioned and other objects, in a damper of the kind mentioned in the outset, according to the present invention the spring seat of said at least one spring valve assembly comprises at least one axial projection perimetrically engaging said at least one disc and a circular gap is provided between said spring seat and said supporting member.

Such a construction enables for centering of the spring seat only with relation to the upper deflectable disc of the spring valve assembly, so that no guidance of the seat is required for its axial movement and no sliding problems occur.

Preferably said spring seat comprises one axial projection or alternatively a number of axial projections distributed, preferably equiangularly, over the outer perimeter thereof.

Preferably axially outer diameter of said at least one axial projection is larger than its axially inner diameter to ensure axial guidance of the spring seat over said at least one disc during assembly of the hydraulic damper.

Preferably said at least one valve assembly is a part of a piston valve assembly.

Alternatively or additionally (in case of a twin-tube damper) said at least one valve assembly may form a part of a base valve assembly.

BRIEF DESCRIPTION OF DRAWINGS

The exemplary embodiments of the present invention are presented below in connection with the attached drawings on which:

FIG. 3 is a schematic cross-sectional view of a fragment of a piston assembly known from the state of art;

FIG. 4 is a schematic cross-sectional view of a fragment of a piston assembly shown in FIG. 1;

DETAILED DESCRIPTION OF PREFERRED EMBODIMENTS

Figure 1:
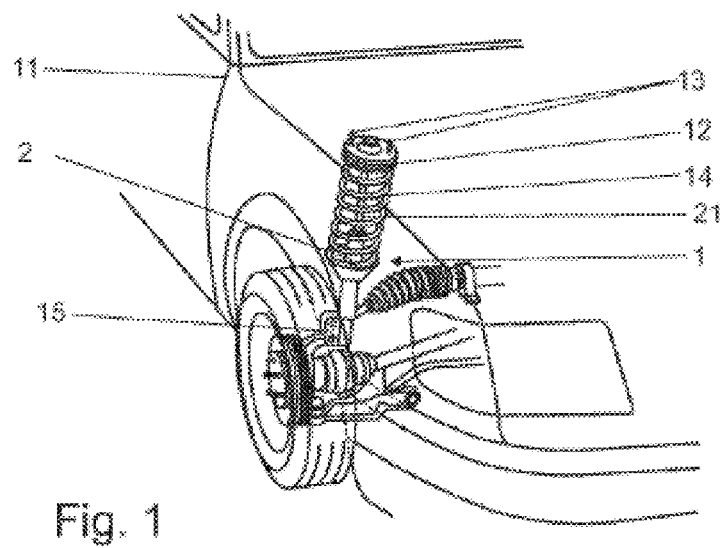
FIG. 1 schematically illustrates a front right motor vehicle suspension.

FIG. 1 schematically illustrates a fragment of an exemplary vehicle suspension 1 attached to a vehicle chassis 11 by means of a top mount 12 and a number of screws 13 disposed on the periphery of the upper surface of the top mount 12. The top mount 12 is connected to a coil spring 14 and a rod 21 of a mono- or twin-tube hydraulic damper 2. Inside a tube of the damper 2 a piston assembly attached to the rod 21 led outside the tube is slidably disposed. At the other end the damper tube is connected to the steering knuckle 15 or a swing arm supporting the vehicle wheel.

Figure 2:
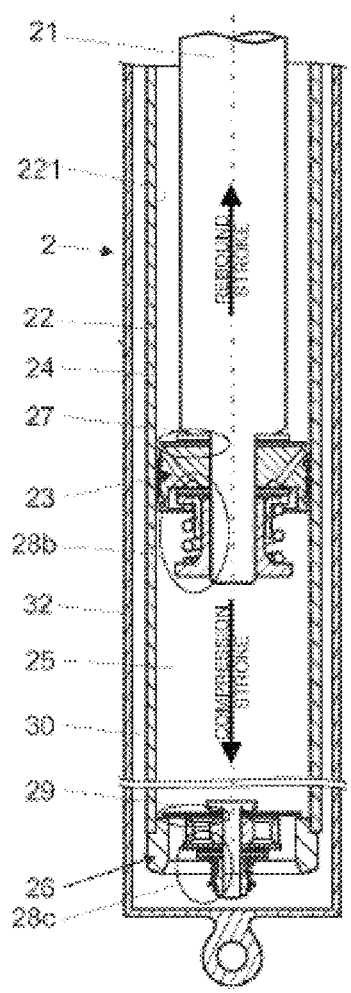
FIG. 2 is a schematic cross-sectional view of a fragment of a hydraulic damper according to the present invention provided with two embodiments of a valve assembly.

A hydraulic damper 2 shown in part in FIG. 2 is an example of a twin-tube damper that may be employed in a vehicle suspension 1 presented in FIG. 1. It comprises a movable piston assembly 23 making a sliding fit with the inner surface 221 of the tube 22 and dividing the tube 22 into a rebound chamber 24 (above the piston assembly) and a compression chamber 25 (below the piston assembly).

At one end the piston rod 21 passes through and is secured to the piston assembly 23. The other end of the piston rod 21 is led axially outside the damper 2 through a sealed rod guide (not shown). At the compression end, the tube 22 is closed by a base valve assembly 26.

Valve assemblies 27 and 28b of the piston assembly 23 control the flow of working liquid passing between the rebound chamber 24 and the compression chamber 25 while the piston is in movement. Similarly, valve assemblies 29 and 28c control the flow of working liquid passing between the compression chamber 25 and an additional compensation chamber 30 located between the tube 22 and the second outer tube 32 of the damper.

Valve assembly 28b of the piston assembly 23 has been illustrated in FIG. 4 in comparison to the valve assembly 28a known from the state of art illustrated in FIG. 3. Above and below, reference numerals of elements performing the same or similar functions remain the same, wherein suffixes (b-c) have been added to distinguish particular embodiments of the invention, where appropriate.

As shown, axial member in a form of partially threaded projection 211 of the piston rod 21 supports the compression valve assembly 27, a piston body 231 and the rebound valve assembly 28b.

The compression valve assembly 27 comprises a number of discs 271 deflectably covering the compression through channels (not shown) in the piston body 23. Similarly, the stack of deflectable discs 281 covers the rebound through channels 282 in the piston body 231. All elements of the piston assembly 23 are clamped at the inner circumferential portions thereof by a supporting member in a form of a shoulder nut 285 screwed on the external thread provided on a part of the projection 211 with a predetermined torque. Supporting member 285 clamps at least one disc 271 of the valve assembly 27 at the inner circumferential part thereof.

Deflectable discs 281 are additionally preloaded by a spring 284 compressed between the shoulder of the nut 285 and a spring seat 283a or 283b disposed to displace along the longitudinal axis of the damper 2 in order to angularly equalize possible variations in axial pressure of the spring over its perimeter transferred to the top disc 281 surface. Furthermore, each spring seat 283a and 283b is provided with two circumferential projections 2831 and 2832 to control deflection of the discs under the pressure of the working liquid flowing through the channels 282 during rebound stroke of the damper 2.

Number, shape, diameter and thickness of discs 281, number and diameter of the channels 282 and preload of the spring 284, among others, constitute the parameters that are used to adjust damping forces.

As shown the spring seat 283a known from the state of art is disposed to slide over the surface of the shoulder nut 285 and in its sliding movement is guided by the surface of the shoulder nut 285. Therefore this sliding movement is prone to dry friction that is influenced by various factors, such as possible buckling of the spring that generates bending moment over the spring seat 283a so it may grind over the surface of the shoulder nut 285. Dimensional tolerance of the particular elements of the assembly also influences the operation of a valve assembly after it is manufactured.

If for example a nominal diameter of the supporting member 285 is $d_1$ and nominal diameter of the spring seat 283a is $d_2$ then to ensure the sliding movement between any pair of these components taken out of the production batch:

$$d_1/2 + \Delta d_1/2 < d_2/2 - \Delta d_2/2$$

where $\Delta d_1$ and $\Delta d_2$ are respectively upper deviation of the supporting member 285 diameter and lower deviation of the spring seat 283a diameter. From the inequality above it follows that a gap will usually exist between the spring seat 283a and the shoulder nut 285 at least in some angular areas due to mutual eccentricity of these elements. This gap will obviously negatively influence sliding between these elements.

Contact between the spring seat 283a and the shoulder nut 285 is obviously necessary for the sliding guidance of the spring seat 283a over the shoulder nut 285 but at the same time, due to the unpredictable (inevitable axial shift of these elements) locations of these areas of contact and the contact itself, aforementioned friction problems occur.

Figure 5:
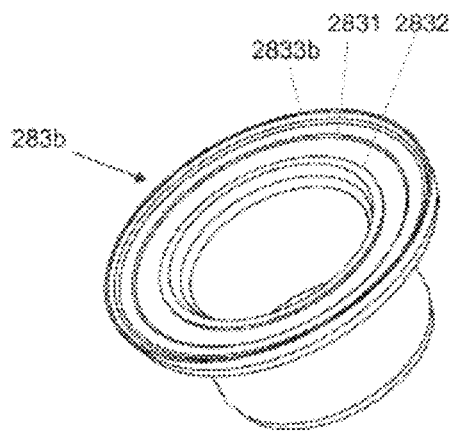
FIG. 5 and FIG. 6 show two exemplary spring seats that may be employed in a damper according to the present invention.

As shown in FIG. 4 the spring seat 283b of the present invention is centered in relation to the top disc 281 by perimetrically engaging the seat 283b by means of an axial projection 2833b. In this embodiment, the seat 285b is provided with one projection 2833b extending over the whole perimeter of the seat 283b (cf. FIG. 5) and abutting the perimetric edge of the top disc 281.

As shown outer diameter of the axial projection 2833b is slightly larger than its axially inner diameter, do that the seat 285b simply draws over the top disc 281 during assembly of the piston assembly 23.

A circular gap 286 is provided between the inner surface of the sleeve-like part of the seat 283b and the external surface of the shoulder nut 285. In a result, the seat 283b is guided solely by means of the top disc 281 in such a manner that the seat 283b does not contact the shoulder nut 285 at all during its axial movement. The sleeve-like part of the seat 283b serves only for positioning (centering) the spring 284 relative to the seat 283b and for guiding the spring 284. In other words the gap 286 serves to avoid contact of the seat 283b and the shoulder nut 285 and is not an obstacle for the axial movement of these two components that is required in the assembly 28a known from the state of art (cf. FIG. 3).

Figure 6:
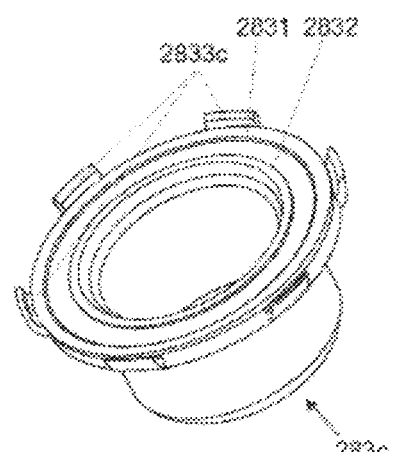

FIG. 6 presents an alternative embodiment of the spring seat 283c provided with six axial projections 2833c equiangularly distributed over the outer perimeter of the seat 283c. The seat 283c may be successfully employed in the valve assembly 28b in place of the seat 283b of FIG. 5.

Figure 7:
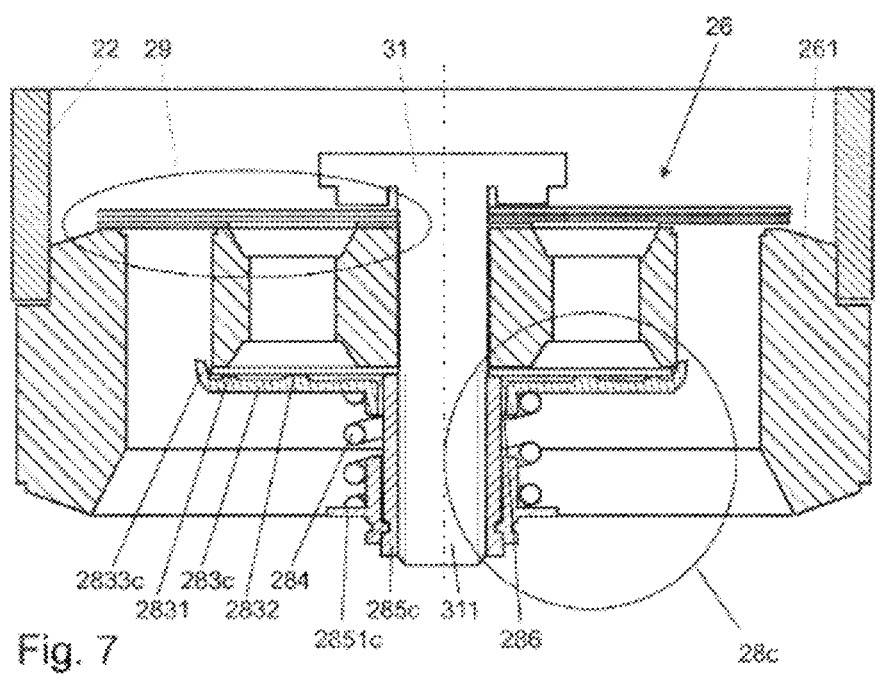
FIG. 7 is a schematic cross-sectional view of a fragment of a base valve assembly shown in FIG. 2.

FIG. 7 presents a detailed view of the base valve assembly 26 of the hydraulic damper 2 shown in part in FIG. 2. Axial partially threaded projection 311 of a bolt 31 of the base valve assembly 26 supports the compression valve assembly 28c and the rebound valve assembly 29 on a body 261 of the base valve assembly 26. The deflectable discs of the valve assemblies 28c and 29 are clamped on the projection 311 at the inner circumferential portions thereof by a nut 285c screwed on the external thread provided on part of the projection 311 with a predetermined torque. Deflectable discs of the compression valve assembly 28c are preloaded by a spring 284 compressed between a supporting member 2851c and the spring seat 283c of FIG. 6. The supporting member in a form of a clamp nut 2851c is clamped on the nut 285c forming at least one indent in at least one circular undercut of the nut 285c.

Similarly as in the rebound valve assembly 28b of FIG. 4, between the inner surface of the sleeve-like part of the seat 283c and the outer surface of the external surface of the nut 285c a circular gap is provided, wherein the seat 283c is centered in relation to the disc of the valve assembly 28c by means of the axial projections 2833c perimetrically engaging the disc.

As the seat 283c is not guided by the nut 285c, it may be substantially shortened to a length sufficient only for reliable catching the uppermost one or two coils of the spring 284 thus enabling for appropriate positioning of the spring 284 relative to the seat 283c. In comparison with the embodiment of FIG. 4, such a construction is less sensitive to possible axial distortions of the seat 283c. In order to compensate shortening of the spring seat 283c, the supporting member 2851c is provided with a lengthened section guiding the spring 284 and providing an improved stabilization and guidance for the lower section of the spring 284.

In order to measure the influence of valve assembly of the present invention on the damper performance the inventors conducted the following experiment.

Eight springs have been used of various deflection angle defined as an angle between bottom and top surfaces of the spring so that a perfect spring would have a zero angle. Springs 1-3 were three different but typical springs used in valve assemblies of this kind; springs 4-8 were additionally deformed in order to artificially increase this naturally present deflection angle. Three spring seats have been used: two spring seats according to the present invention (Spring seat No. 1, cf. 283b on FIG. 4 and FIG. 5 and Spring seat No. 2 cf. 283c on FIG. 6) and a standard spring seat (Spring seat No. 3, cf. 283a on FIG. 3).

Springs and seats were mounted on a piston assembly of a twin-tube damper as shown in FIG. 2 wherein each spring was tested with each spring seat so that 24 experiments have been performed.

TABLE 1

Maximum values of force hysteresis

| Spring | | Observed "force gap" D | | |
|---|---|---|---|---|
| No. | Deflection angle [deg] | Seat No 1 | Seat No 2 | Seat No 3 (comparative) |
| 1 | 0.49 | 0.0311 | 0.0182 | 0.1048 |
| 2 | 0.68 | 0.0283 | 0.0192 | 0.0997 |
| 3 | 0.38 | 0.0266 | 0.0153 | 0.1069 |
| 4 | 5.96 | 0.0334 | 0.0199 | 0.1253 |
| 5 | 1.21 | 0.0266 | 0.0217 | 0.1059 |
| 6 | 0.76 | 0.0159 | 0.0215 | 0.1453 |
| 7 | 1.54 | 0.028 | 0.018 | 0.173 |
| 8 | 1.66 | 0.0264 | 0.037 | 0.0805 |
| AVERAGE: | | 0.027 | 0.021 | 0.118 |

Testing procedure involved measuring damping force as a piston rod velocity input sinusoidal function and subsequently determining the maximum measured difference D ("force gap") during rebound stroke between damping forces observed for the same velocity value during acceleration and deceleration of the piston rod.

Figure 8:
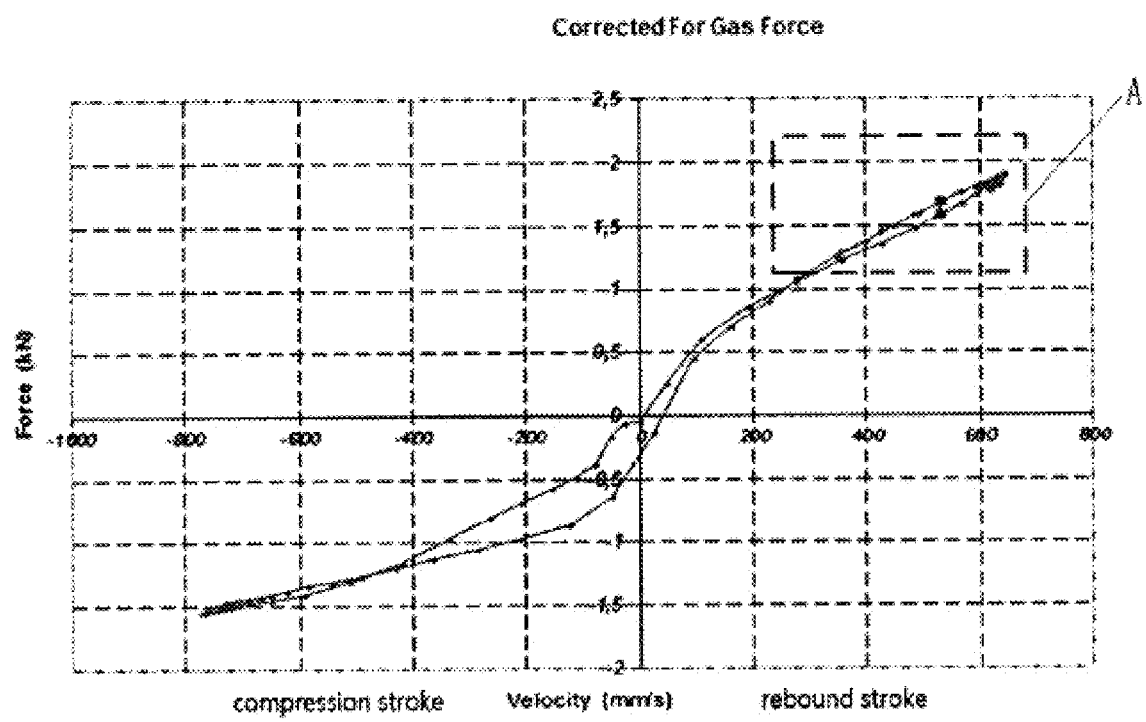
FIG. 8 is a force to velocity characteristic illustrating the testing procedure carried out for a damper made according to the principles of the present invention.
Figure 9:
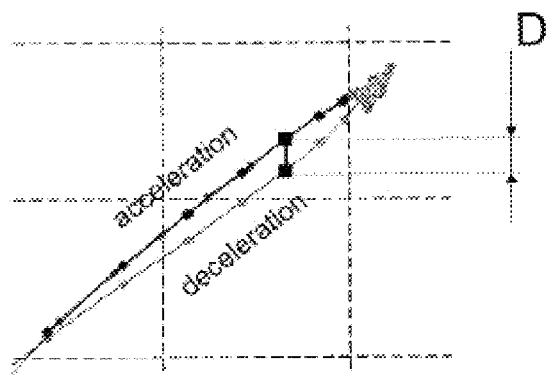
FIG. 9 is a detailed view of the hysteresis area A of the characteristic shown in FIG. 8.

Results of the testing procedure are listed in Table 1 and illustrated in FIGS. 8, 9 showing a force to velocity characteristic observed for a standard spring seat 283a shown on FIG. 3.

As shown, the valve assembly with a spring seat of the present invention allowed on average for 77% (Spring seat No. 1) and 82% reduction (Spring seat No. 2) of the measured "force gap" with respect to the typical spring seat known from the prior art.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper for a motor vehicle suspension, comprising:
   a tube filled with working liquid inside of which a slidable piston body attached to a piston rod led outside the damper is disposed, wherein the flow of the working liquid is controlled within said tube during the rebound and the compression stroke of the slidable piston body by at least one spring valve assembly provided with an axial member and rebound and compression valve assemblies surrounding the axial member;
   wherein said at least one spring valve assembly comprises:
   a slidable piston body provided with through flow channels;
   at least one deflectable disc covering said through flow channels;
   a supporting member fixed to said axial member for clamping said at least one disc at an inner circumferential part thereof, said supporting member having an outer surface;
   a spring seat disposed around said supporting member and including a rim portion extending radially outwardly and at least one axial projection abutting said at least one disc in at least one radial position at an outer circumferential part thereof, and said spring seat further including a sleeve part extending axially from said rim portion and having an inner surface;

a spring preloaded between the spring seat and the supporting member;

wherein said at least one axial projection extends axially from said rim portion away from said spring and perimetrically engages at least one disc and being tapered from a first inner diameter axially farthest from said rim portion to a smaller second inner diameter axially proximate said rim portion for guiding said spring seat over said at least one disc during assembly of the hydraulic damper, and wherein a circular gap is provided between said inner surface of said sleeve part of said spring seat and said external surface of said supporting member.

2. The hydraulic damper according to claim 1, wherein said spring seat includes said axial projection over the outer perimeter thereof.

3. The hydraulic damper according to claim 1, wherein said at least one axial projection includes a plurality of axial projections distributed equiangularly over the outer perimeter of said spring seat.

4. The hydraulic damper according to claim 1 wherein said at least one valve assembly is a part of a piston valve assembly.

5. The hydraulic damper according to claim 1 wherein said at least one valve assembly is a part of a base valve assembly.

6. The hydraulic damper according to claim 1 wherein said tube extends along a center axis; wherein said rim portion of said spring seat extends perpendicularly to said center axis; and wherein said sleeve portion of said spring seat has a tube-shape and extends parallel to said center axis away from said rim portion.

* * * * *